(12) United States Patent
Hattori et al.

(10) Patent No.: US 9,895,738 B2
(45) Date of Patent: Feb. 20, 2018

(54) APPARATUS AND METHOD FOR MANUFACTURING A KNUCKLE BRACKET

(71) Applicant: KAYABA INDUSTRY CO., LTD., Tokyo (JP)

(72) Inventors: Taiji Hattori, Gifu (JP); Yoshihiko Yamauchi, Aichi (JP); Tomomi Hayase, Gifu (JP)

(73) Assignee: KYB Corporation, Tokyo (JP)

( * ) Notice: Subject to any disclaimer, the term of this patent is extended or adjusted under 35 U.S.C. 154(b) by 197 days.

(21) Appl. No.: 14/781,574

(22) PCT Filed: Mar. 28, 2014

(86) PCT No.: PCT/JP2014/059207
§ 371 (c)(1),
(2) Date: Sep. 30, 2015

(87) PCT Pub. No.: WO2014/168028
PCT Pub. Date: Oct. 16, 2014

(65) Prior Publication Data
US 2016/0059298 A1    Mar. 3, 2016

(30) Foreign Application Priority Data

Apr. 10, 2013 (JP) ................................. 2013-081779

(51) Int. Cl.
*B21D 53/00* (2006.01)
*B21D 53/36* (2006.01)
(Continued)

(52) U.S. Cl.
CPC .............. *B21D 53/00* (2013.01); *B21D 28/32* (2013.01); *B21D 35/001* (2013.01); *B21D 53/36* (2013.01);
(Continued)

(58) Field of Classification Search
CPC .......... B21D 53/00; B21D 53/88; B21D 7/02; B21D 7/08; B21D 28/32; B21D 35/001; B21D 53/36; F16F 9/3242; F16F 9/54
(Continued)

(56) References Cited

U.S. PATENT DOCUMENTS 2,676,638 A * 4/1954 Wheeler ................ B21D 11/02
72/296
4,491,339 A * 1/1985 Mizumukai .......... B60G 13/006
188/321.11
(Continued)

FOREIGN PATENT DOCUMENTS

| JP | H09-89036 A | | 3/1997 |
|---|---|---|---|
| JP | 2000-154842 | * | 6/2000 |

*Primary Examiner* — David B Jones
(74) *Attorney, Agent, or Firm* — Rabin & Berdo, P.C.

(57) ABSTRACT

A knuckle bracket includes a bracket main body that has an inner peripheral shape along a tube of a shock absorber and a pair of attachment parts that are formed to protrude parallel to each other. The apparatus for manufacturing the knuckle bracket includes a width molding machine that molds a width of the pair of attachment parts in a state where the workpiece is supported on a support shaft, and a hole punching machine that machines attachment holes into the pair of attachment parts in a state where the workpiece is supported on the support shaft. The workpiece is transported from the width molding machine to the hole punching machine by moving the workpiece along the support shaft until the workpiece is above the die after the support shaft is raised and then lowering the support shaft until the support shaft abuts a top surface of the die.

3 Claims, 14 Drawing Sheets

(51) Int. Cl.
| | |
|---|---|
| *F16F 9/54* | (2006.01) |
| *F16F 9/32* | (2006.01) |
| *B60G 13/00* | (2006.01) |
| *B21D 28/32* | (2006.01) |
| *B21D 35/00* | (2006.01) |

(52) U.S. Cl.
CPC .......... *B60G 13/005* (2013.01); *F16F 9/3242* (2013.01); *F16F 9/54* (2013.01); *B60G 2200/142* (2013.01); *B60G 2204/4304* (2013.01)

(58) Field of Classification Search
USPC ........................................................ 72/333
See application file for complete search history.

(56) References Cited

U.S. PATENT DOCUMENTS

| | | | | |
|---|---|---|---|---|
| 5,308,032 | A * | 5/1994 | Ohta | B60G 13/006 248/230.2 |
| 6,881,004 | B2 * | 4/2005 | Handke | B60G 15/07 188/322.19 |
| 2008/0066289 | A1 * | 3/2008 | Gokan | B21D 28/32 29/505 |
| 2016/0059298 | A1 * | 3/2016 | Hattori | B21D 53/36 72/333 |
| 2016/0067764 | A1 * | 3/2016 | Bayer | B21D 11/10 29/897.2 |

* cited by examiner

PRESS MOLDING STEP

RIB BENDING AND MOLDING STEP

BENDING AND MOLDING STEP

WIDTH MOLDING STEP

HOLE PUNCHING STEP

APPARATUS AND METHOD FOR MANUFACTURING A KNUCKLE BRACKET

TECHNICAL FIELD

The present invention relates to an apparatus and method for manufacturing a knuckle bracket for attaching a shock absorber to a vehicle.

BACKGROUND ART

JP1997-89036A discloses a conventional knuckle bracket including a curved part extending in an axial direction and linear parts formed on both ends in the circumferential direction of the curved part, in which a lower end part of a hydraulic shock absorber is inserted and fixed inside the curved part. Attachment holes into which bolts for attaching to a vehicle are inserted are formed in the pair of linear parts.

SUMMARY OF INVENTION

In general, when manufacturing a knuckle bracket, the curved part and the linear parts are molded by blank machining and then bending a plate material, and finally the attachment holes are formed by punching holes in the pair of linear parts. The holes can also be punched prior to blank machining, but in this method it is difficult to ensure the coaxiality of the attachment holes formed in the pair of linear parts. Thus, in order to ensure the coaxiality of the attachment holes, the holes are generally punched last in the manufacturing process.

It is necessary to punch the holes using a dedicated press machine that is separate from the line on which the blank machining and bending are carried out. Therefore, punching the holes generates extra costs, and leads to an increase in the manufacturing costs of the knuckle bracket.

An object of the present invention is to reduce the manufacturing costs of a knuckle bracket.

According to one aspect of the present invention, a knuckle bracket includes a bracket main body that has an inner peripheral shape along a tube of a shock absorber and is fixed to the tube and a pair of attachment parts that are formed to protrude parallel to each other from both ends of the bracket main body and are fastened to a steering knuckle. The apparatus for manufacturing the knuckle bracket includes: a support shaft that has an outer peripheral shape along the inner peripheral shape of the bracket main body and supports a workpiece; a width molding machine that molds a width of the pair of attachment parts to a predetermined dimension in a state in which the workpiece is supported on the support shaft; and a hole punching machine that machines attachment holes into the pair of attachment parts in a state in which the workpiece is supported on the support shaft and the pair of attachment parts are facing both side surfaces of a die. The workpiece is transported from the width molding machine to the hole punching machine by moving the workpiece along the support shaft until the workpiece is above the die after the support shaft is raised and then lowering the support shaft until the support shaft abuts a top surface of the die.

According to another aspect of the present invention, a knuckle bracket includes a bracket main body that has an inner peripheral shape along a tube of a shock absorber and is fixed to the tube and a pair of attachment parts that are formed to protrude parallel to each other from both ends of the bracket main body and are fastened to a steering knuckle. The method for manufacturing the knuckle bracket includes: a width molding step in which a width of the pair of attachment parts is molded to a predetermined dimension; and a hole punching step in which attachment holes are machined into the pair of attachment parts in a state in which the pair of attachment parts are facing both side surfaces of a die. The width molding step and the hole punching step are carried out in a state in which the workpiece is supported on a support shaft that has an outer peripheral shape along the inner peripheral shape of the bracket main body. The workpiece is transported from the width molding step to the hole punching step by moving the workpiece along the support shaft until the workpiece is above the die after the support shaft is raised and then lowering the support shaft until the support shaft abuts a top surface of the die.

DESCRIPTION OF EMBODIMENTS

An embodiment of the present invention will now be explained below with reference to the drawings.

A manufacturing apparatus 100 for a knuckle bracket 1 according to an embodiment of the present invention will now be explained.

Figure 1:
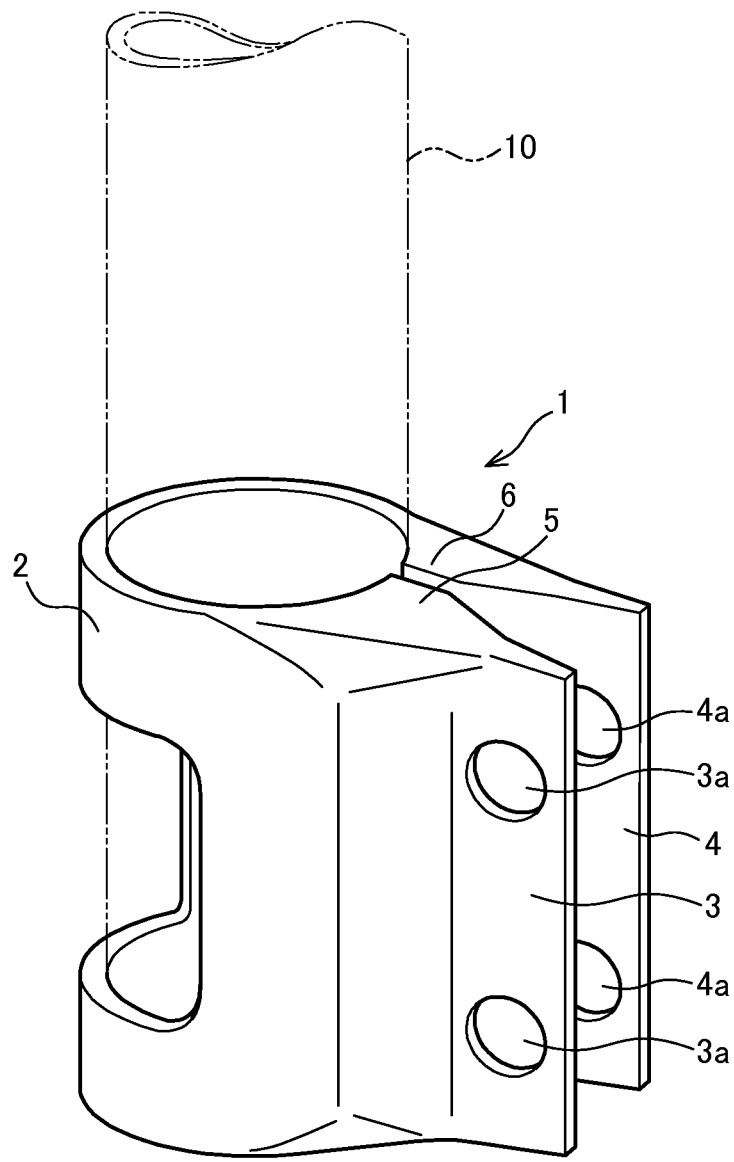
FIG. 1 is a perspective view of a knuckle bracket.
Figure 2A:
FIG. 2A is a plan view of a workpiece obtained by a press molding step.
Figure 2B:
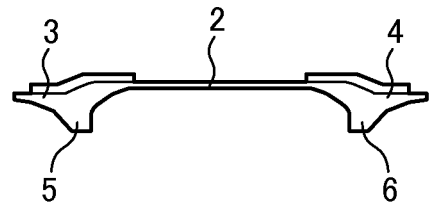
FIG. 2B is a plan view of a workpiece obtained by a rib bending and molding step.
Figure 2C:
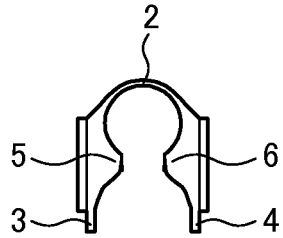
FIG. 2C is a plan view of a workpiece obtained by a bending and molding step.
Figure 2D:
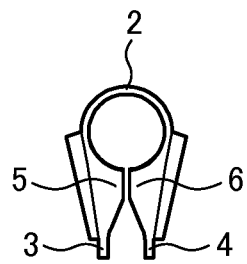
FIG. 2D is a plan view of a workpiece obtained by a width molding step.
Figure 2E:
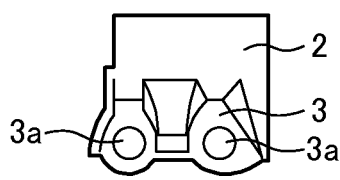
FIG. 2E is a side view of a workpiece obtained by a hole punching step.

First, the knuckle bracket 1 will be explained referring to FIG. 1. The knuckle bracket 1 is for attaching a shock absorber to a steering knuckle of a vehicle.

The knuckle bracket 1 includes a bracket main body 2 that has a C-shaped cross-section and an inner peripheral shape that follows a tube 10 of a shock absorber, a pair of attachment parts 3 and 4 that are formed to protrude parallel to each other from both ends of the bracket main body 2 and are fastened to a steering knuckle, and a pair of ribs 5 and 6 serving as deflected parts that are formed to deflect to the inside from the ends of the pair of attachment parts 3 and 4.

The bracket main body 2 is fixed by welding to a bottom part of the tube 10 of the shock absorber in a state in which it encloses the tube 10.

Two each of attachment holes 3a and 4a for bolt fastening are formed in the pair of attachment parts 3 and 4 respectively. A fastening part of the steering knuckle is inserted between the pair of attachment parts 3 and 4, and the pair of attachment parts 3 and 4 are fastened to the steering knuckle by bolts that are inserted into the attachment holes 3a and 4a and the fastening part. In this way, the shock absorber is attached to the steering knuckle via the knuckle bracket 1.

The pair of ribs 5 and 6 is for increasing the strength of the attachment parts 3 and 4.

The knuckle bracket 1 is molded in a process beginning with blank machining in which a metallic plate material is machined and followed by a press molding step, a rib bending and molding step, a bending and molding step, a width molding step, and a hole punching step as shown in FIGS. 2A to 2E. In the blank machining, a substrate of the knuckle bracket 1 is punched from the metallic plate material. In the press molding step, the substrate obtained by the blank machining is press molded to mold the area that will become the bracket main body 2 and the areas that will become the attachment parts 3 and 4. In the rib bending and molding step, the ribs 5 and 6 are molded by bending. In the bending and molding step, the bracket main body 2 is molded by bending. In the width molding step, the width of the pair of attachment parts 3 and 4 is molded to a predetermined dimension. In the hole punching step, the attachment holes 3a and 4a are machined in the pair of attachment parts 3 and 4.

The manufacturing apparatus 100 will now be explained referring to FIGS. 3 to 14.

The manufacturing apparatus 100 consecutively executes the following steps with a transfer press: the press molding step, the rib bending and molding step, the bending and molding step, the width molding step, and the hole punching step. The manufacturing apparatus 100 has dedicated metal molds for executing each step, and automatically machines the workpiece 9 consecutively as the workpiece 9 is transported to the metal molds for each step in order.

Figure 3:
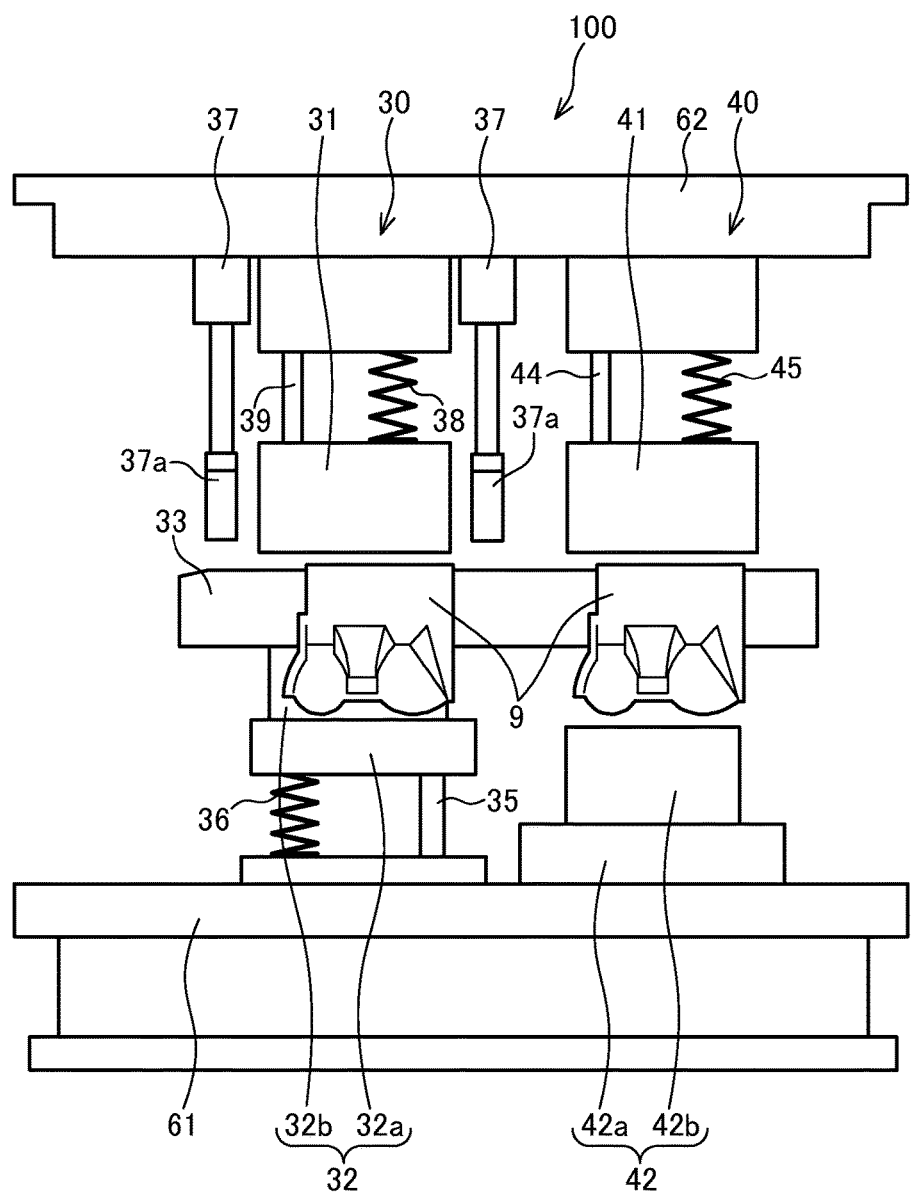
FIG. 3 is a side view illustrating a manufacturing apparatus for a knuckle bracket according to an embodiment of the present invention, in a state in which a top frame is positioned at top dead center.
Figure 6:
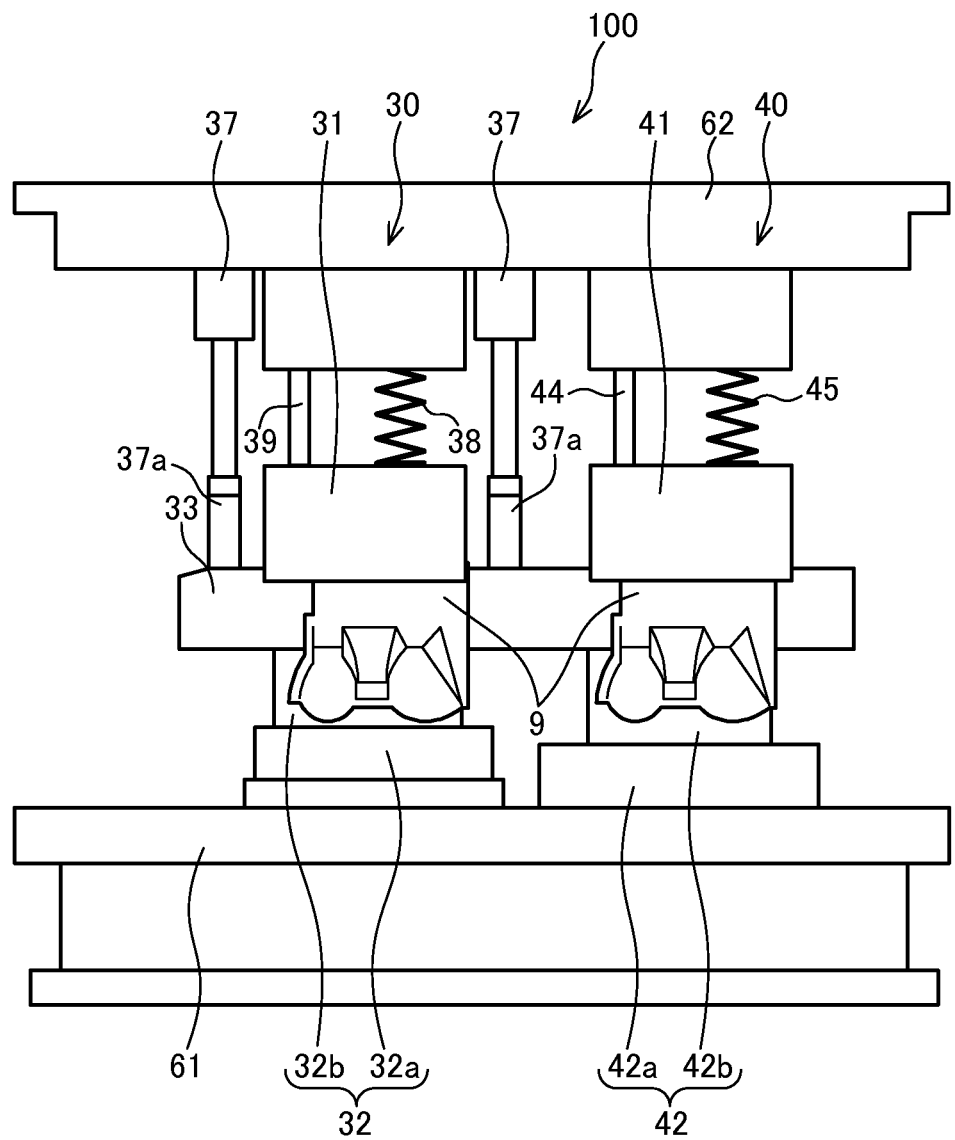
FIG. 6 is a side view illustrating the manufacturing apparatus for a knuckle bracket according to the embodiment of the present invention, in a state in which the top frame is positioned between top dead center and bottom dead center.
Figure 9:
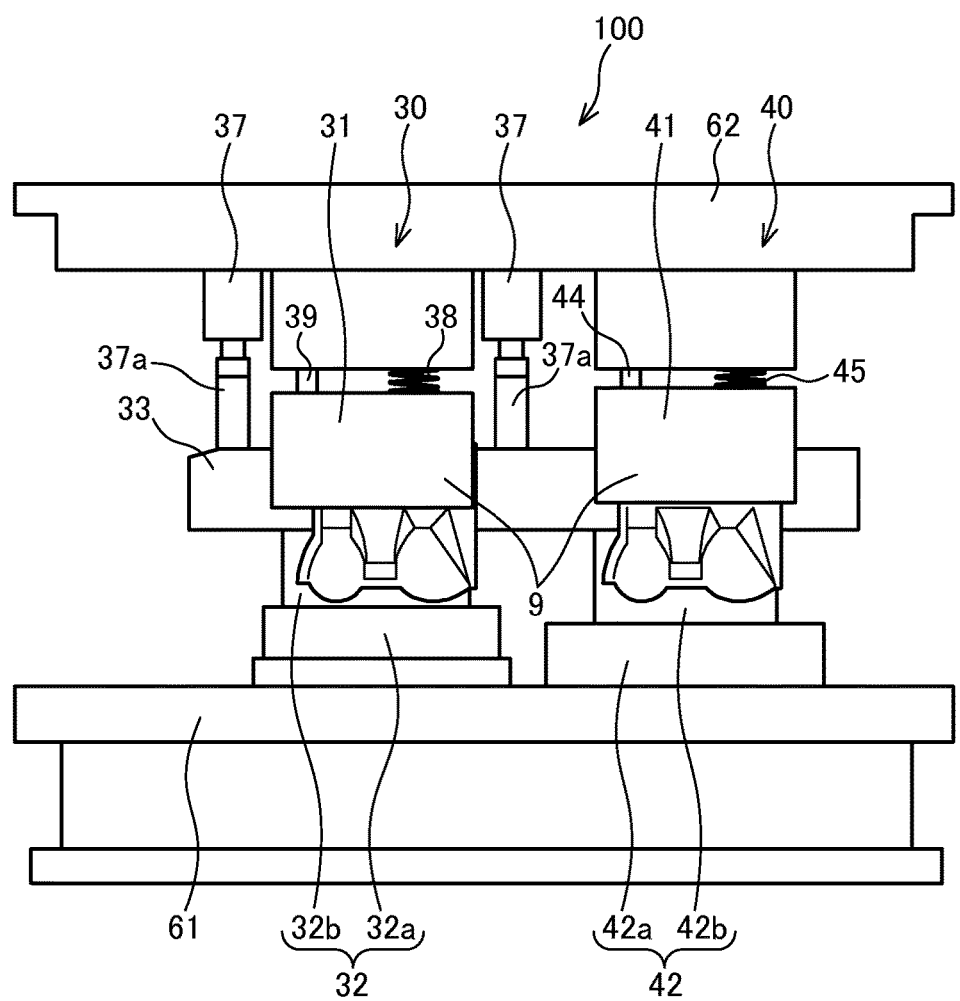
FIG. 9 is a side view illustrating the manufacturing apparatus for a knuckle bracket according to the embodiment of the present invention, in a state in which the top frame is positioned at bottom dead center.

The manufacturing apparatus 100 includes a press machine that executes the press molding step, a rib bending and molding machine that executes the rib bending and molding step, a bending and molding machine that executes the bending and molding step, a width molding machine 30 that executes the width molding step, and a hole punching machine 40 that executes the hole punching step. In FIGS. 3, 6, and 9, only the width molding machine 30 and the hole punching machine 40 are illustrated, and the press machine, the rib bending and molding machine, and the bending and molding machine are omitted from the drawings.

The manufacturing apparatus 100 includes a top frame 62 configured such that it can move up and down. Dedicated metal molds 31 and 41 for executing the width molding step and the hole punching step are provided on the top frame 62. As a drive source for moving the top frame 62 up and down, for example, a hydraulic cylinder or a servo motor can be used.

Figure 4:
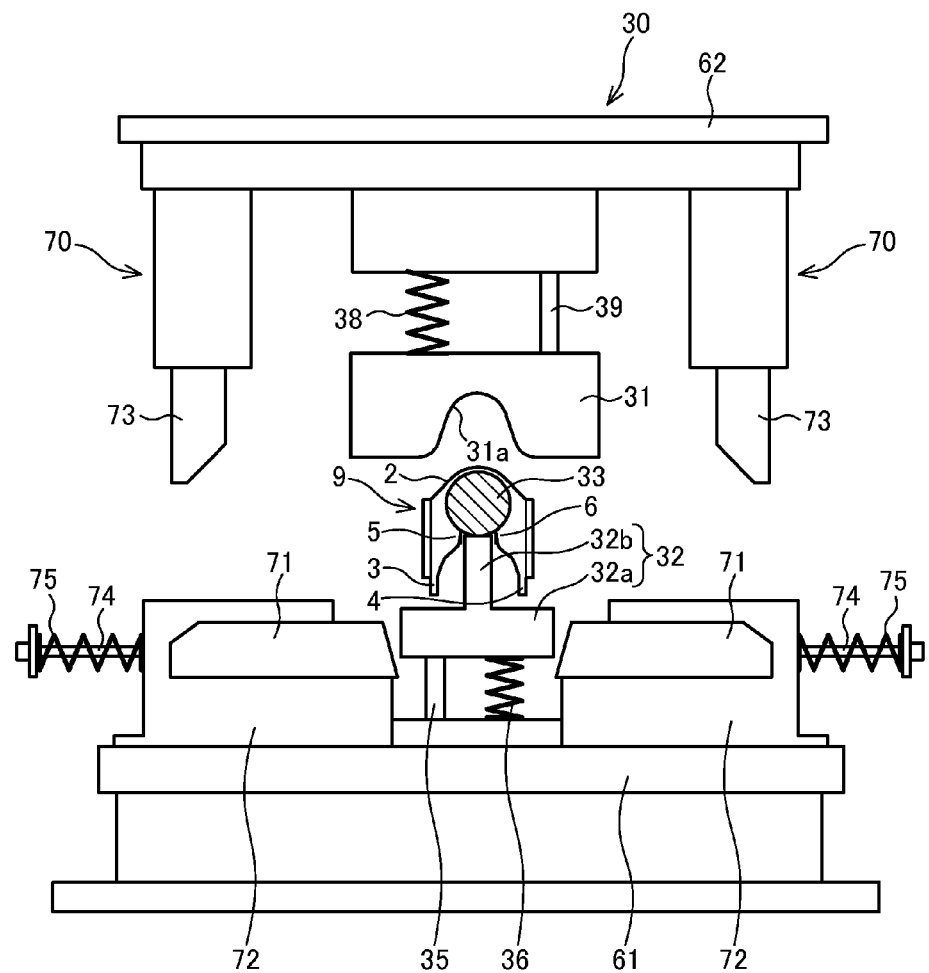
FIG. 4 is a front view of a width molding machine in the state shown in FIG. 3.
Figure 5:
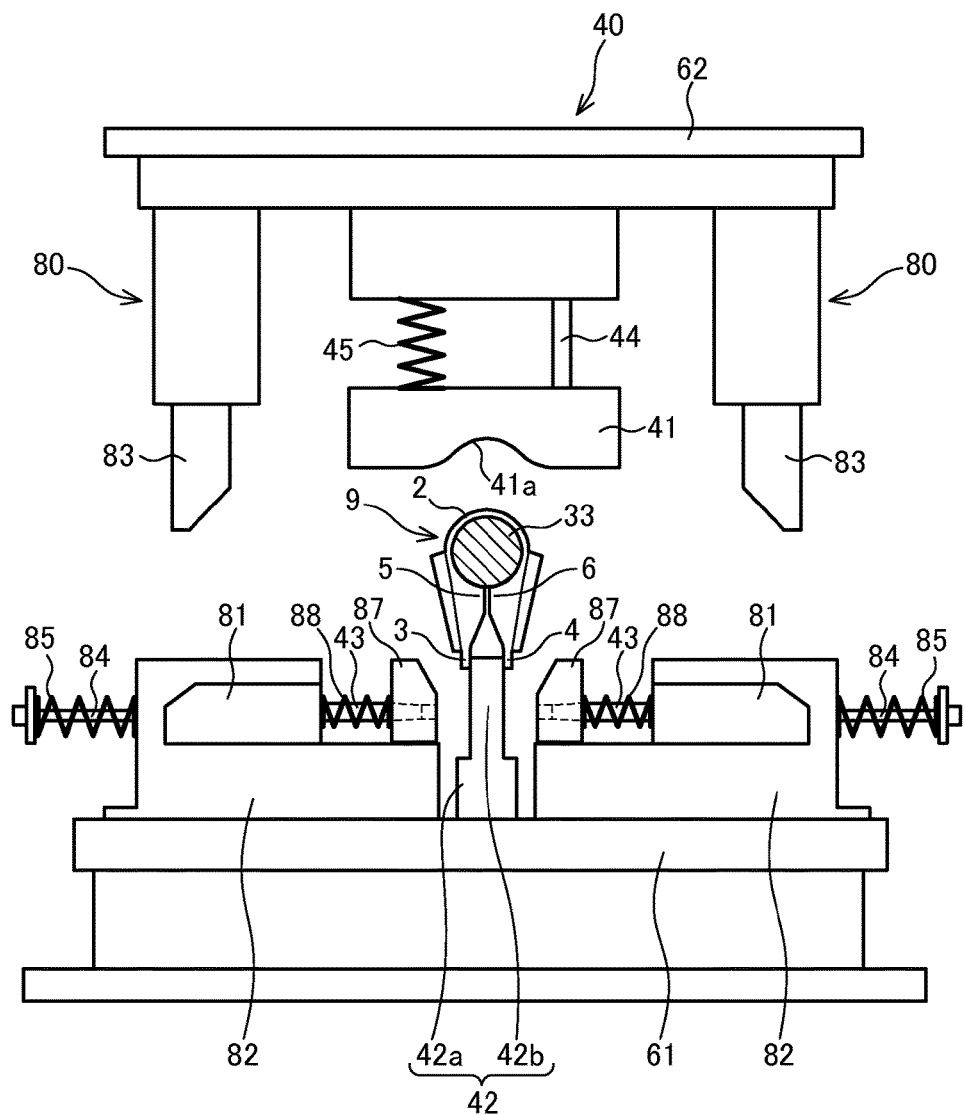
FIG. 5 is a front view of a hole punching machine in the state shown in FIG. 3.
Figure 7:
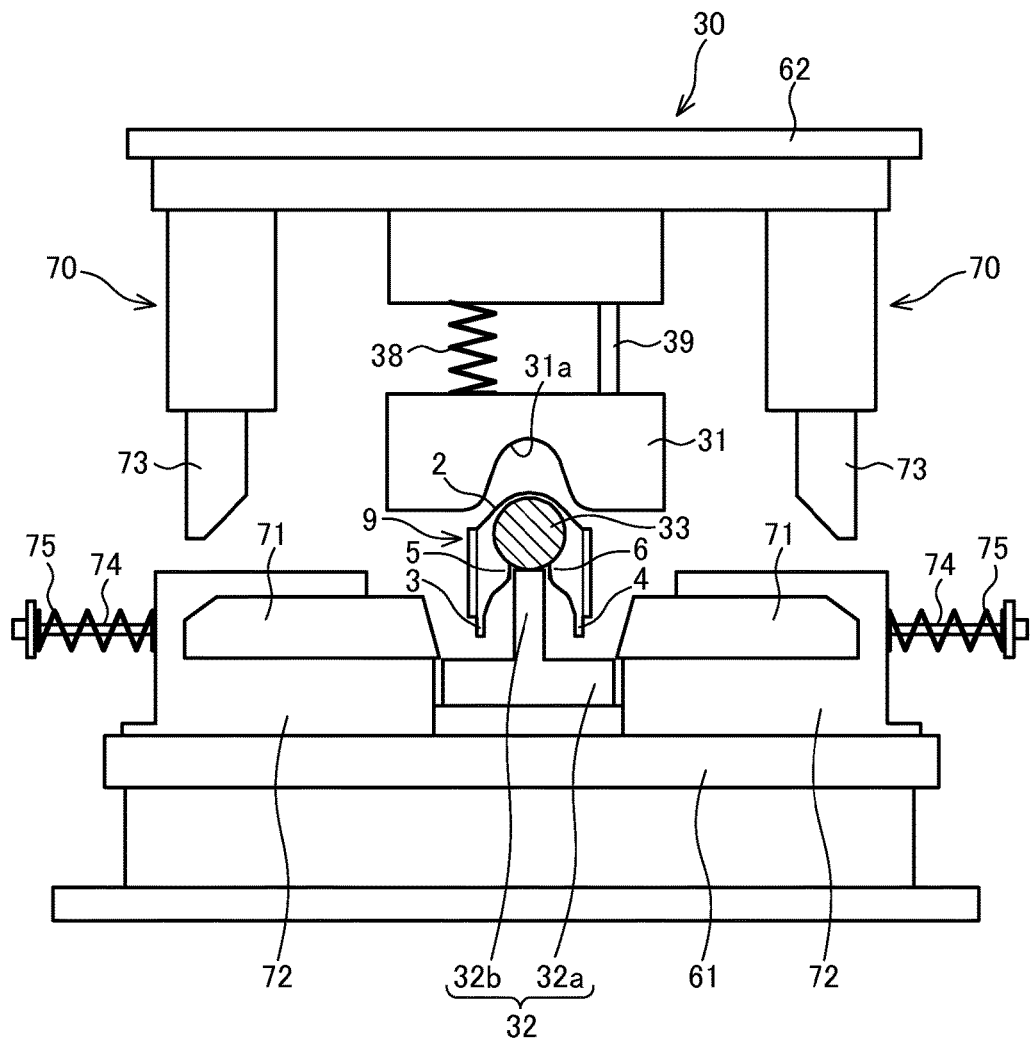
FIG. 7 is a front view of the width molding machine in the state shown in FIG. 6.
Figure 8:
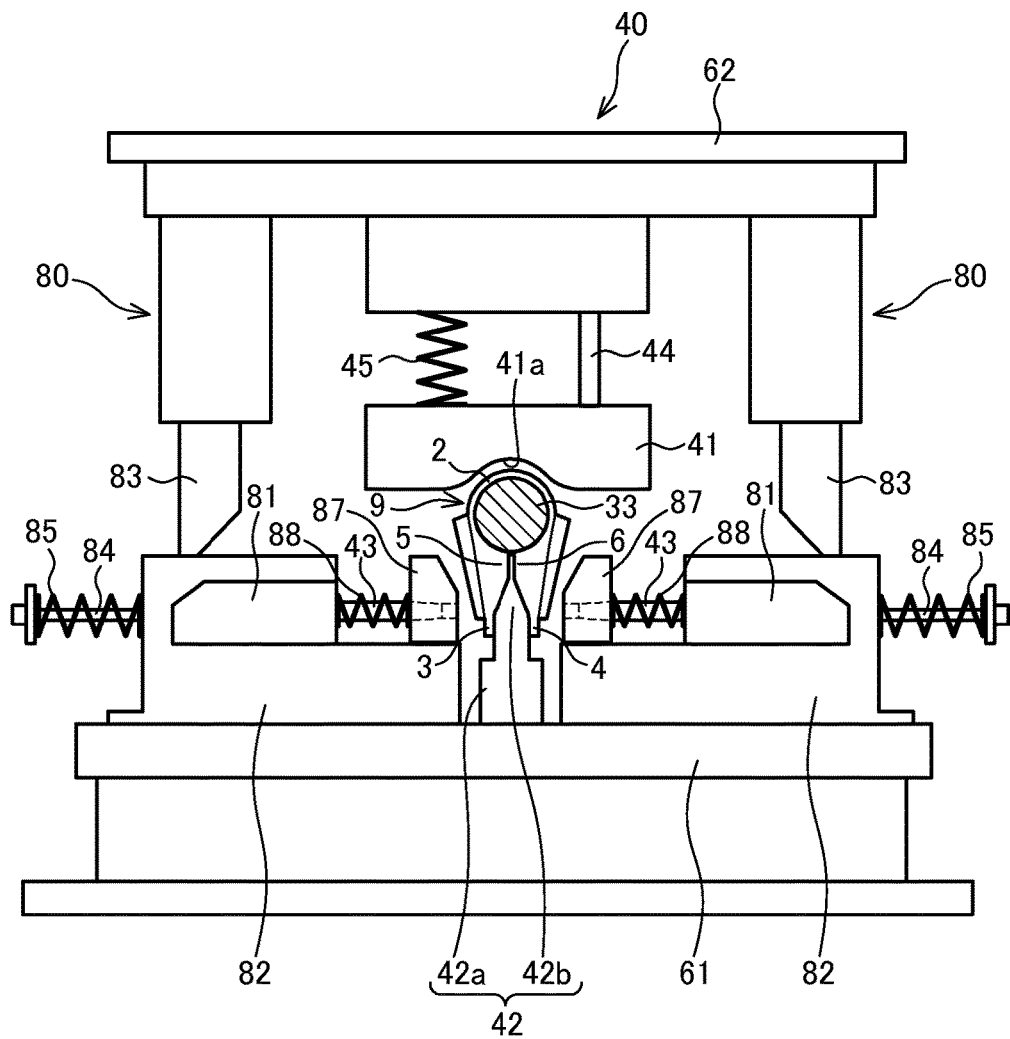
FIG. 8 is a front view of the hole punching machine in the state shown in FIG. 6.
Figure 10:
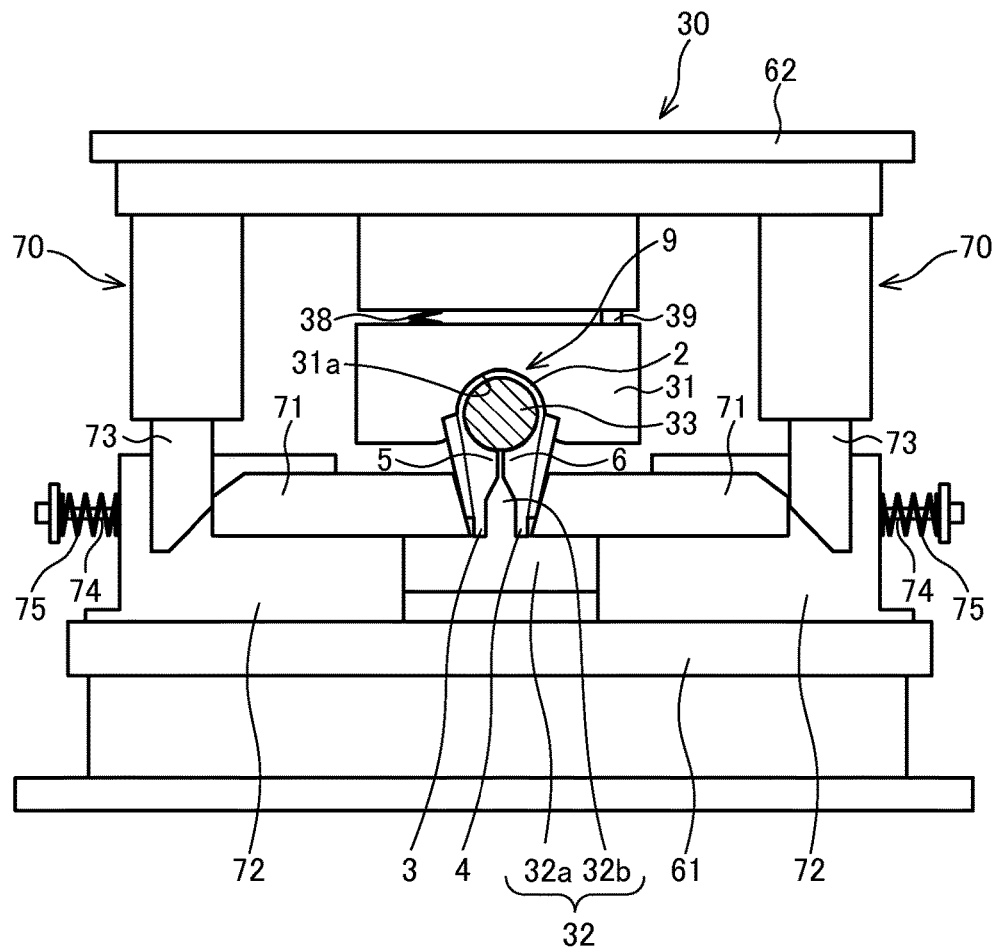
FIG. 10 is a front view of the width molding machine in the state shown in FIG. 9.
Figure 11:
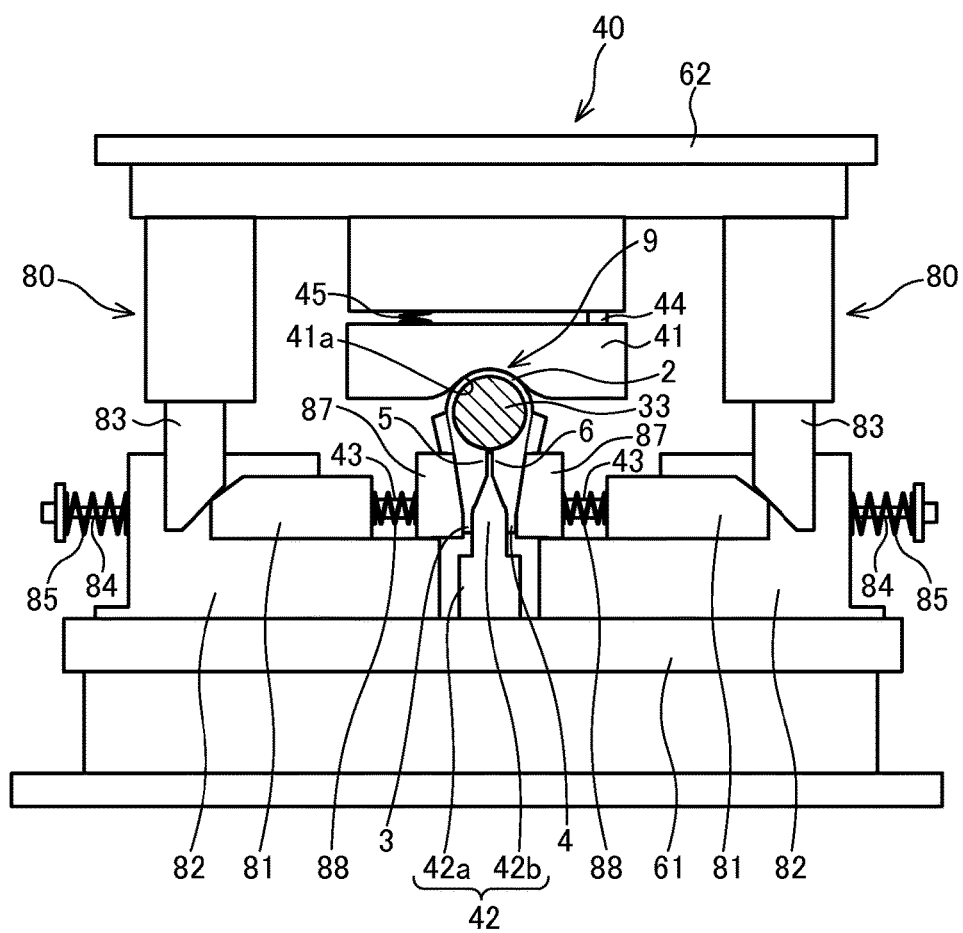
FIG. 11 is a front view of the hole punching machine in the state shown in FIG. 9.

The workpiece 9 is automatically machined by transporting the workpiece 9 to the width molding machine 30 and the hole punching machine 40 by a transport mechanism (not illustrated) in sync with the reciprocal movement of the top frame 62 between the top dead center as shown in FIG. 3 and the bottom dead center as shown in FIG. 9. The workpiece is transported in a state in which the top frame 62 is positioned at the top dead center, and the molding of each step is executed as the top frame 62 lowers from the top dead center to the bottom dead center. FIGS. 3 to 5 illustrate a state in which the top frame 62 is positioned at the top dead center, FIGS. 6 to 8 illustrate a state in which the top frame 62 is positioned between the top dead center and the bottom dead center, and FIGS. 9 to 11 illustrate a state in which the top frame 62 is positioned at the bottom dead center.

First, the width molding machine 30 will be explained referring to FIGS. 3, 4, 6, 7, 9, and 10.

The width molding machine 30 includes a receiving die 32 provided on a bottom frame 61 such that it can move up and down, a core mold 33 serving as a support shaft that supports the workpiece 9, a metal mold 31 that is provided on the top frame 62 and supports the workpiece 9 between itself and the core mold 33 during the width molding step of the pair of attachment parts 3 and 4, and a compression mechanism 70 that compresses the pair of attachment parts 3 and 4 to the receiving die 32.

The receiving die 32 includes a base 32a and a receiving part 32b that is positioned between the pair of attachment parts 3 and 4 and defines the width dimension of the pair of attachment parts 3 and 4. The base 32a is supported on the bottom frame 61 via a guide pin 35 that can freely slide in the bottom frame 61 and a spring 36.

The core mold 33 is a cylindrical mold that has an outer peripheral shape that follows an inner peripheral shape of the bracket main body 2. The core mold 33 is formed to be joined to an upper end of the receiving part 32b of the receiving die 32. In this way, the core mold 33 and the receiving die 32 are integrally formed. The core mold 33 is formed to extend to the hole punching machine 40 of the subsequent step, and is used for both the width molding step and the hole punching step.

The metal mold 31 is suspended downward from the top frame 62 via a guide pin 39 that can freely slide in the top frame 62 and a spring 38. The metal mold 31 has a mold milling 31a that follows the outer peripheral shape of the bracket main body 2.

A pair of gas cylinders 37 is provided on the top frame 62. Pins 37a are provided on rod tips of the gas cylinders 37. The gas cylinders 37 cause the core mold 33 to lower when the pins 37a abut the core mold 33 before the metal mold 31 abuts the workpiece 9 when the top frame 62 lowers from the top dead center to the bottom dead center. In FIGS. 4, 7, and 10, the gas cylinders 37 are not illustrated.

As shown in FIGS. 4, 7, and 10, the compression mechanism 70 includes sliders 71 that are provided such that they can freely slide on both sides of the receiving die 32 and impart a compressive force on the pair of attachment parts 3 and 4, support bases 72 that are provided on the bottom frame 61 and support the sliders 71, and wedge cams 73 that are provided on both sides of the metal mold 31 on the top frame 62 and cause the sliders 71 to advance toward the receiving part 32b and generate a compressive force.

An inclined surface corresponding to the inclined surface of the wedge cam 73 is formed on the back surface of each slider 71. When the top frame 62 lowers from the top dead center to the bottom dead center, the inclined surfaces of the wedge cams 73 push against the inclined surfaces on the back surfaces of the sliders 71, and thereby the sliders 71 advance forward.

The tips of bolts 74 that are inserted into the support bases 72 such that they can freely slide are fastened onto the rear ends of the sliders 71. Return springs 75 are interposed between the head parts of the bolts 74 and the support bases 72. When the wedge cams 73 are pushed against the sliders 71 and the sliders 71 advance forward, the return springs 75 are contracted between the head parts of the bolts 74 and the support bases 72. When the pushing of the wedge cams 73 on the sliders 71 is released, the sliders 71 retreat due to the biasing force of the return springs 75 and return to their original positions.

The operation of the width molding machine 30 will now be explained.

The workpiece 9 is transported from the bending and molding machine, which is the previous step, to the width molding machine 30 in a state in which the top frame 62 is positioned at the top dead center. In the state in which the top frame 62 is positioned at the top dead center, the receiving die 32 is biased by the biasing force of the spring 36, and the core mold 33 is raised to its maximum height (the state shown in FIGS. 3 and 4). In this state, the workpiece 9 is gripped and transported by transport fingers provided on the transport mechanism and supported on the core mold 33. In this way, the workpiece 9 is transported from the bending and molding machine to the width molding machine 30.

When the top frame 62 lowers from the top dead center to the bottom dead center, before the wedge cams 73 are pushed by the sliders 71, the pins 37a of the gas cylinders 37 abut the core mold 33 and the core mold 33 is pushed down and lowered by the gas cylinders 37. Thereby, the receiving die 32 that is integral with the core mold 33 is lowered while compressing the spring 36 to abut the bottom frame 61 (the state shown in FIGS. 6 and 7). Thereby, the sliders 71 enter a state in which they can advance forward without interfering with the base 32a of the receiving die 32. Also, the core mold 33 that is integral with the receiving die 32 is positioned at its minimum height.

When the top frame 62 lowers further from the state shown in FIG. 7, the gas cylinders 37 begin to contract, and the mold milling 31a of the metal mold 31 abuts the outer periphery of the bracket main body 2 of the workpiece 9. Thereby, the workpiece 9 enters a state in which it is supported between the core mold 33 and the metal mold 31.

When the top frame 62 lowers further while compressing the gas cylinders 37 and the spring 38, the wedge cams 73 are pushed against the sliders 71 and the sliders 71 proceed forward. The sliders 71 push against the pair of attachment parts 3 and 4 toward the receiving part 32b. Thereby, the width of the pair of attachment parts 3 and 4 is molded to a predetermined dimension (the state shown in FIGS. 9 and 10). The width of the attachment parts 3 and 4 becomes approximately equal to the width of the receiving part 32b, and thus the width of the attachment parts 3 and 4 can be molded to a desired dimension by adjusting the width of the receiving part 32b.

During width molding, the workpiece 9 is supported on the core mold 33 so that the ribs 5 and 6 follow the edge surfaces of the receiving part 32b without interfering with the receiving part 32b, or in other words so that the ribs 5 and 6 do not interfere with the receiving part 32b and inhibit the width molding. Specifically, when the workpiece 9 is transported to the core mold 33 from the bending and molding machine, which is the previous step, the workpiece 9 is positioned relative to the receiving part 32b. The positioning of the workpiece 9 is carried out by, for example, controlling the amount of movement of the workpiece 9 with a servo motor that drives the transport fingers.

When the top frame 62 rises from the bottom dead center to the top dead center, the pushing of the wedge cams 73 on the sliders 71 is released, and thus the sliders 71 return to their original positions due to the biasing force of the return springs 75.

In the state in which the top frame 62 has reached the top dead center, the pushing of the gas cylinders 37 on the core mold 33 and the biasing of the metal mold 31 by the spring 38 are released. Thus, the receiving die 32 is biased by the biasing force of the spring 36 and the core mold 33 enters a state in which it has risen to its maximum height (the state shown in FIG. 3).

Next, the hole punching machine 40 will be explained referring to FIGS. 3, 5, 6, 8, 9, and 11 to 13.

The hole punching machine 40 includes a receiving die 42 provided on the bottom frame 61, the core mold 33 that is shared by the width molding machine 30 and supports the workpiece 9, a metal mold 41 that is provided on the top frame 62 and supports the workpiece 9 between itself and the core mold 33 during the machining of the attachment holes 3a and 4a, punches 43 that punch the attachment holes 3a and 4a in the pair of attachment parts 3 and 4, and a driving mechanism 80 that drives the punches 43.

The receiving die 42 includes a base 42a and a receiving part 42b that is sandwiched by the pair of attachment parts 3 and 4 during machining of the attachment holes 3a and 4a. A through hole 42c (refer to FIGS. 12 and 13) into which the punches 43 enter during machining of the attachment holes 3a and 4a is formed in the receiving part 42b.

The metal mold 41 is suspended downward from the top frame 62 via a guide pin 44 that can freely slide in the top frame 62 and a spring 45. The metal mold 41 has a mold milling 41a that follows the outer peripheral shape of the bracket main body 2.

The driving mechanism 80 includes sliders 81 which are provided on both sides of the receiving die 42 such that they can freely move in the axial direction of the punches 43 and support the punches 43, support bases 82 that are provided on the bottom frame 61 and support the sliders 81, and wedge cams 83 that are provided on both sides of the metal mold 41 on the top frame 62 and cause the sliders 81 to advance toward the receiving part 42b.

An inclined surface corresponding to the inclined surface of the wedge cam 83 is formed on the back surface of each slider 81. When the top frame 62 lowers from the top dead center to the bottom dead center, the inclined surfaces of the wedge cams 83 push against the inclined surfaces on the back surfaces of the sliders 81, and thereby the sliders 81 advance forward.

Strippers 87 that push portions of the attachment parts 3 and 4 outside of those to be punched to prevent deformation of the attachment parts 3 and 4 when the attachment parts 3 and 4 are punched by the punches 43 are provided on the punches 43. The punches 43 penetrate through the strippers 87, and springs 88 are interposed between the strippers 87 and the sliders 81.

The tips of bolts 84 that are inserted into the support bases 82 such that they can freely slide are fastened onto the rear ends of the sliders 81. Return springs 85 are interposed between the head parts of the bolts 84 and the support bases 82. When the wedge cams 83 are pushed against the sliders 81 and the sliders 81 advance forward, the return springs 85 are contracted between the head parts of the bolts 84 and the support bases 82. When the pushing of the wedge cams 83 on the sliders 81 is released, the sliders 81 retreat due to the biasing force of the return springs 85 and return to their original positions.

The operation of the hole punching machine 40 will now be explained below.

The workpiece 9 is transported from the width molding machine 30, which is the previous step, to the hole punching machine 40 in a state in which the top frame 62 is positioned at the top dead center. As described above, in the state in which the top frame 62 is positioned at the top dead center, the core mold 33 is positioned at its maximum height (the state shown in FIG. 3). In this state, the workpiece 9, which is supported on the core mold 33 upon completion of width molding by the width molding machine 30, is gripped by the transport fingers provided on the transport mechanism to slide it along the core mold 33 and move it until it is above the receiving die 42. When the workpiece 9 is sliding, the height of the core mold 33 is set such that the workpiece 9 does not interfere with the receiving part 42b of the receiving die 42, or in other words such that the sliding of the workpiece 9 is not inhibited by the receiving part 42b.

When the top frame 62 lowers from the top dead center to the bottom dead center, before the wedge cams 83 are pushed by the sliders 81, the core mold 33 is lowered until it abuts the top surface of the receiving part 42b by the action of the gas cylinders 37 (the state shown in FIGS. 6 and 8). In this state, the pair of attachment parts 3 and 4 sandwich both side surfaces of the receiving part 42b, and the ribs 5 and 6 follow the edge surfaces of the receiving part 42b without interfering with the receiving part 42b. In this way, the core mold 33 is lowered such that the ribs 5 and 6 do not interfere with the receiving part 42b. In other words, the workpiece 9 is supported on the core mold 33 such that the ribs 5 and 6 do not interfere with the receiving part 42b when the core mold 33 is lowered. Specifically, when the workpiece 9 is transported by sliding along the core mold 33, the workpiece 9 is positioned relative to the receiving part 42b. The positioning of the workpiece 9 is carried out by, for example, controlling the amount of movement of the workpiece 9 with a servo motor that drives the transport fingers.

When the top frame 62 lowers further from the state shown in FIG. 8, the gas cylinders 37 begin to contract, and the mold milling 41a of the metal mold 41 abuts the outer periphery of the bracket main body 2 of the workpiece 9. Thereby, the workpiece 9 enters a state in which it is supported between the core mold 33 and the metal mold 41.

When the top frame 62 lowers further while compressing the gas cylinders 37 and the spring 45, the wedge cams 83 are pushed against the sliders 81 and the sliders 81 proceed forward. The distal end surfaces of the strippers 87 and the punches 43 abut the outside surfaces of the attachment parts 3 and 4 of the workpiece 9 due to the forward movement of the sliders 81. If the sliders 81 continue moving forward, the punches 43 cut into the attachment parts 3 and 4 and the strippers 87 are pushed against the attachment parts 3 and 4 by the biasing force of the springs 88 that are compressed between the strippers 87 and the sliders 81. As the sliders 81 advance forward, the distal ends of the punches 43 reach the through hole 42c of the receiving part 42b, and the attachment parts 3 and 4 are punched (the state shown in FIGS. 11 and 13).

When the top frame 62 rises from the bottom dead center to the top dead center, the pushing of the wedge cams 83 on the sliders 81 is released, and thus the sliders 81 return to their original positions due to the biasing force of the return springs 85.

In the state in which the top frame 62 has reached the top dead center, the pushing of the gas cylinders 37 on the core mold 33 and the biasing of the metal mold 41 by the spring 45 are released. Thus, the core mold 33 enters a state in which it has risen to its maximum height due to the biasing force of the spring 36 of the width molding machine 30 (the state shown in FIG. 3).

Finally, the workpiece 9 supported on the core mold 33 is collected, and the molding of the knuckle bracket 1 is complete.

According to the embodiment described above, the following operational effects are achieved.

Since the workpiece 9 is moved from the width molding machine 30 to the hole punching machine 40 along the core mold 33, the machining of the attachment holes 3a and 4a is carried out consecutively with the width molding of the pair of attachment parts 3 and 4, and a dedicated press machine is not needed. Therefore, the manufacturing costs of the knuckle bracket 1 can be reduced.

Further, the workpiece 9 is transported from the width molding machine 30 to the hole punching machine 40 by moving the workpiece 9 along the core mold 33 until the workpiece 9 is above the receiving die 42 after the core mold 33 is raised and then lowering the core mold 33 until the core mold 33 abuts the top surface of the receiving part 42b of the receiving die 42. In this way, the workpiece 9 is set on the receiving part 42b from above the receiving part 42b. Herein, as opposed to setting the workpiece 9 on the receiving part 42b from above the receiving part 42b, consider a hypothetical case in which the workpiece 9 is set on the receiving part 42b by only sliding it along the core mold 33. In this case, it would be necessary to shape the receiving part 42b as shown by the diagonal lines in FIG. 14 and to provide a thin neck part as indicated by reference numeral 95 in FIG. 14 so that the ribs 5 and 6 of the workpiece 9 would not interfere with the receiving part 42b. With such a shape, the rigidity of the receiving part 42b could not be secured, and thus the width molding step and the hole punching step could not be consecutively carried out. Therefore, the hole punching step would have to be carried out with a dedicated press machine.

Figure 12:
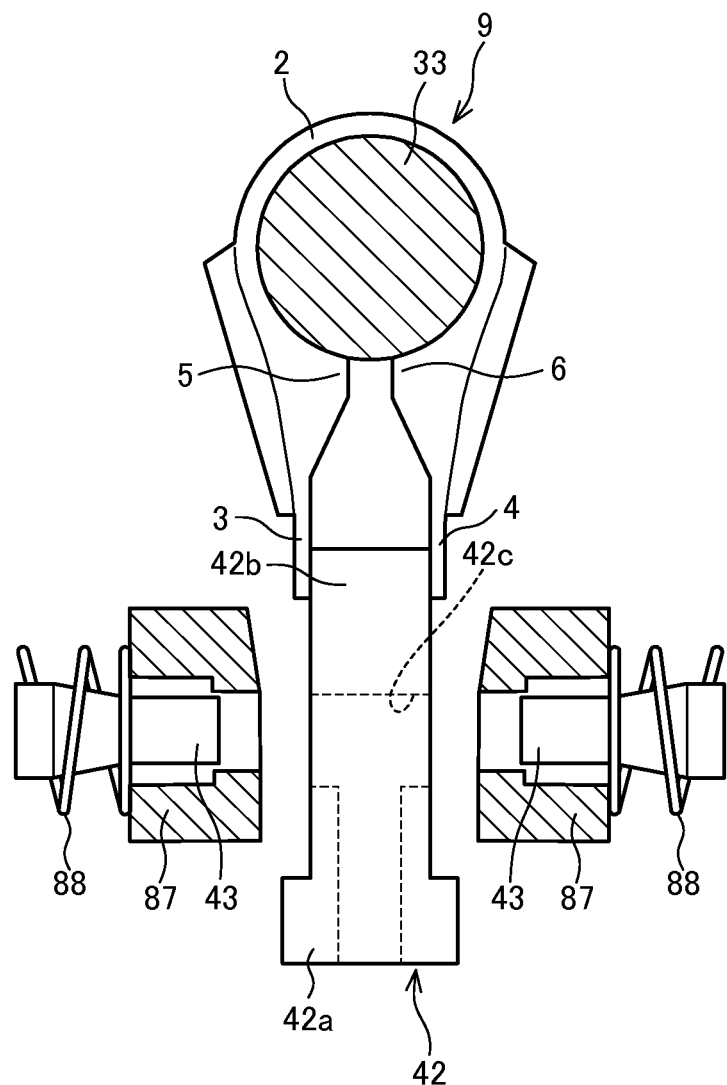
FIG. 12 is a partially enlarged view of FIG. 5.
Figure 13:
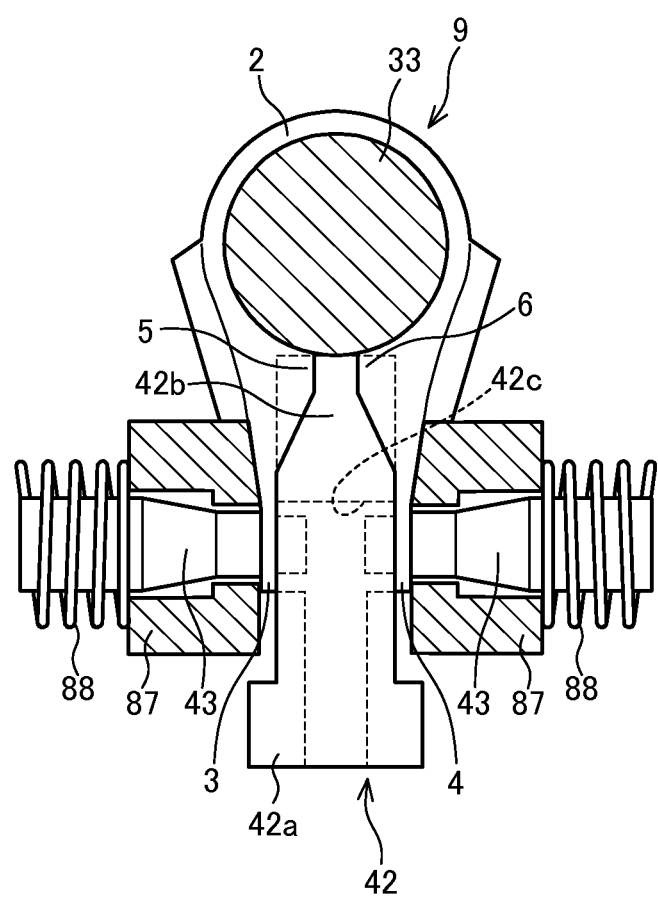
FIG. 13 is a partially enlarged view of FIG. 11.
Figure 14:
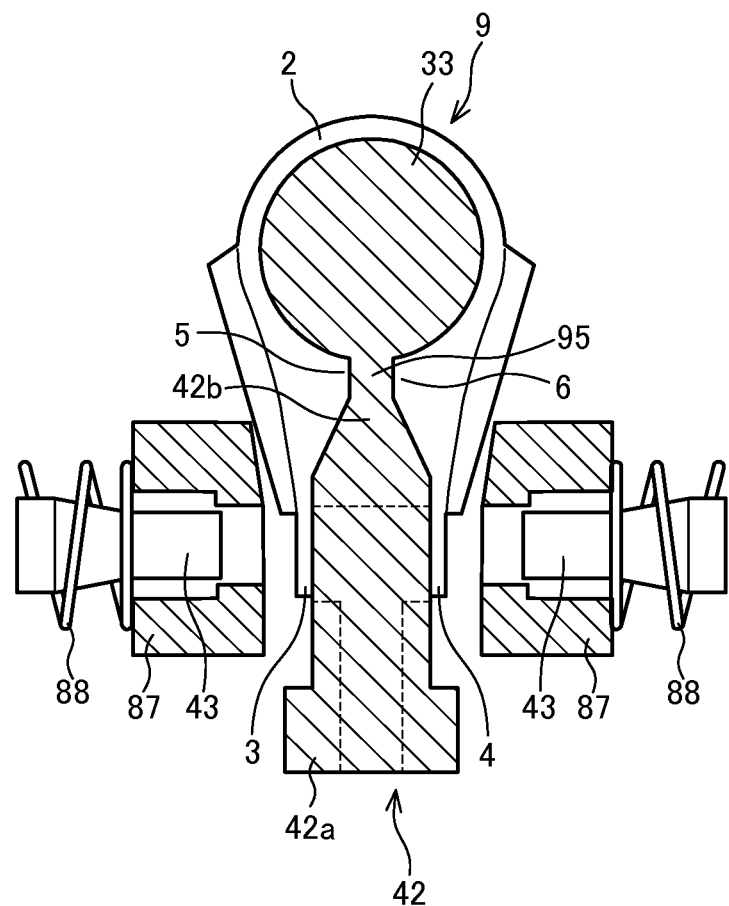
FIG. 14 is a view illustrating a comparative embodiment.

However, according to the present embodiment, the workpiece 9 is set on the receiving part 42b from above the receiving part 42b, and thus it is not necessary to provide the neck part 95 to the receiving part 42b as shown in FIGS. 12 and 13 and the rigidity of the receiving part 42b can be secured. In this way, in the present embodiment, since the workpiece 9 is set on the receiving part 42b from above the receiving part 42b, the width molding step and the hole punching step can be consecutively carried out.

Alternative embodiments of the present embodiment will now be explained below.

(1) In the above-described embodiment, the following steps were consecutively executed with a transfer press: a press molding step, a rib bending and molding step, a bending and molding step, a width molding step, and a hole punching step. Instead of a transfer press, the above-mentioned steps can also be carried out by a progressive press that continuously supplies a continuous plate material. In this case, it is necessary to match the height during transport of the workpiece 9 to each step and to match the height during molding of the workpiece 9 when the top frame 62 is at the bottom dead center to each step.

(2) In the above-described embodiment, the width molding step used the sliders 71. Instead of the sliders 71, the width of the pair of attachment parts 3 and 4 can be molded to a predetermined dimension by bending using the metal mold 31.

(3) In the above-described embodiment, the workpiece 9 was bent and molded with the bending and molding machine and then the width of the pair of attachment parts 3 and 4 was molded by the width molding machine 30. Instead of these separate steps, the bending and molding of the workpiece 9 can be carried out in the same step as the width molding.

Embodiments of this invention were described above, but the above embodiments are merely examples of applications of this invention, and the technical scope of this invention is not limited to the specific constitutions of the above embodiments.

This application claims priority based on Japanese Patent Application No. 2013-081779 filed with the Japan Patent Office on Apr. 10, 2013, the entire contents of which are incorporated into this specification.

The invention claimed is:

1. An apparatus for manufacturing a knuckle bracket, the knuckle bracket comprising a bracket main body that has an inner peripheral shape along a tube of a shock absorber and is fixed to the tube and a pair of attachment parts that are formed to protrude parallel to each other from ends of the bracket main body and are fastened to a steering knuckle, the apparatus comprising:
   a width-molding machine including
      a width-molding mold configured to, with a support shaft, support a workpiece in a width-molding operation,
      a width-molding die, and
      a compression mechanism configured to compress the workpiece by pressing attachment parts of the workpiece supported by the width-molding die and the support shaft toward the width-molding die to establish a width of a predetermined dimension between the attachment parts;
   a hole-punching machine including
      a hole-punching mold configured to, with the support shaft, support the workpiece in a hole-punching operation,
      a hole-punching die, and
      punches configured to punch attachment holes into the attachment parts having the width of the predetermined dimension in a state in which the support shaft abuts a top surface of the hole-punching die;
   wherein the workpiece is movable along the support shaft to a width-molding position corresponding to the width-molding operation and to a hole-punching position corresponding to the hole-punching operation, and the support shaft is movable toward and away from the hole-punching die in the hole-punching position.

2. A method for manufacturing a knuckle bracket, the knuckle bracket comprising a bracket main body that has an inner peripheral shape along a tube of a shock absorber and is fixed to the tube and a pair of attachment parts that are formed to protrude parallel to each other from both ends of the bracket main body and are fastened to a steering knuckle;
   wherein the method comprises:
      a width molding step in which a width of the pair of attachment parts is molded to a predetermined dimension; and
      a hole punching step in which attachment holes are machined into the pair of attachment parts in a state in which the pair of attachment parts are facing both side surfaces of a die;
   wherein the width molding step and the hole punching step are carried out in a state in which the workpiece is supported on a support shaft that has an outer peripheral shape along the inner peripheral shape of the bracket main body; and
   the workpiece is transported from the width molding step to the hole punching step by moving the workpiece along the support shaft until the workpiece is above the die after the support shaft is raised and then lowering the support shaft until the support shaft abuts a top surface of the die.

3. The method for manufacturing a knuckle bracket according to claim 2, wherein the knuckle bracket further comprises a pair of deflected parts that are formed to deflect to the inside from the ends of the pair of attachment parts, and
   the method further comprises a deflected part molding step in which the deflected parts are molded before the width molding step.

* * * * *